United States Patent
Eriksson

(10) Patent No.: US 7,247,243 B2
(45) Date of Patent: Jul. 24, 2007

(54) METHOD AND DEVICE FOR DETECTING AN ACCUMULATION OF SAND IN A SEPARATOR VESSEL

(75) Inventor: Klas-Gøran Eriksson, Asker (NO)

(73) Assignee: Vetco Gray Scandinavia AS, Billingstad (NO)

( * ) Notice: Subject to any disclaimer, the term of this patent is extended or adjusted under 35 U.S.C. 154(b) by 364 days.

(21) Appl. No.: 10/951,870

(22) Filed: Sep. 29, 2004

(65) Prior Publication Data

US 2005/0072741 A1 Apr. 7, 2005

(30) Foreign Application Priority Data

Oct. 3, 2003 (NO) .................................. 20034429

(51) Int. Cl.
*B01D 21/30* (2006.01)
(52) U.S. Cl. ............... 210/744; 210/86; 210/532.1; 210/800
(58) Field of Classification Search ............... 210/86, 210/537, 744, 745, 803, DIG. 5, 112, 532.1, 210/800; 73/295; 356/301
See application file for complete search history.

(56) References Cited

U.S. PATENT DOCUMENTS

| 1,833,112 | A | | 11/1931 | Harrison |
| 3,797,310 | A | | 3/1974 | Babcock et al. |
| 3,923,655 | A | * | 12/1975 | McKinney ............... 210/742 |
| 3,964,311 | A | | 6/1976 | Holmen |
| 4,307,606 | A | | 12/1981 | Johnson |
| 4,320,656 | A | | 3/1982 | Tiskus |
| 4,912,977 | A | | 4/1990 | Hope |
| 5,449,233 | A | * | 9/1995 | Sai et al. ............... 374/161 |
| 2006/0144140 | A1 | * | 7/2006 | Hache .................... 73/295 |

FOREIGN PATENT DOCUMENTS

| GB | 2396701 A | 6/2004 |
| JP | 58085105 A | 5/1983 |
| JP | 62102121 A | 5/1987 |
| NO | 133517 B1 | 2/1974 |

* cited by examiner

*Primary Examiner*—Matthew O. Savage
(74) *Attorney, Agent, or Firm*—Venable LLP; Eric J. Franklin

(57) ABSTRACT

A separator device including a vessel for separating water from oil. The separator device is provided with a measurer for measuring the temperature of the wall of the vessel.

13 Claims, 2 Drawing Sheets

METHOD AND DEVICE FOR DETECTING AN ACCUMULATION OF SAND IN A SEPARATOR VESSEL

CROSS-REFERENCE TO RELATED APPLICATIONS

This application claims priority to Norwegian patent application 20034429 filed Oct. 3, 2003.

TECHNICAL FIELD

The present invention relates to a method of detecting an accumulation of sand in a separator vessel, the separator being filled with a fluid that has a first temperature and being at least partly surrounded by a fluid that has a second temperature.

The invention also relates to a separator device comprising a vessel for separating water from oil.

The invention is particularly related to the oil-expropriation field in which oil, together with water, gas and particulate matter such as sand is delivered from an underground cavity through a well to a separator device for separating oil from gas, water and sand (mainly). The separator in question may be a gravity separator of the type in which water is permitted to separate from oil by the action of gravity.

The separator vessel may be located on land. However the invention is particularly advantageous for applications in which the vessel is submersed in a mass of water. Accordingly, the invention is particularly related to off-shore plants by which the vessel is positioned sub-sea.

BACKGROUND OF THE INVENTION

In the oil and gas industry it is necessary to be able to record different states in the process in order to be able to suitably control the process. In connection to the separation of oil from water, gas or sand in gravity separators, sand will normally accumulate as one or more heaps or a layer or bed at the bottom of the separator tank as a result of gravitational settling.

In order to be able to control the conditions in the separator tank by controlling the amount of sand gathered at the bottom thereof some kind of measurement or estimation of the amount as well as the distribution of sand is required.

U.S. Pat. No. 4,912,977 discloses a device for position determination of transition zones between at least two different enclosing media. More specifically it discloses a measuring device arranged for determination of the vertical distribution of one or more media which have a thermal connection with the device and where the positions of the interfaces can be determined on the basis of differences in thermal states and properties, comprising an arrangement of one or more thermal conductor elements which have a common thermal reference element and discrete, chiefly thermally insulated sensor areas which have good thermal contact with the medium, being measured through a common partition wall which affords sufficient physical and thermal separation, as well as means for keeping the reference element at a temperature level different from the medium being measured. The temperature sensing elements may be composed of a thermopile, the thermal stress of which generates a voltage that is transmitted to a signal processor for further analysis.

However, this prior art device, though useful for determination of transition zones between for example oil, water, foam and gas in a gravity separator tank, is deemed to be rather complicated for the purpose of measuring the presence of a sand layer or sand heap at the bottom of such a tank. Also, for the purpose of covering a large area of the bottom of the tank, a plurality of such devices would be needed, further increasing the cost.

THE OBJECT OF THE INVENTION

It is a primary object of the present invention to present a method and a device by means of which an accumulation of sand or other solid material on the bottom of a vessel containing any fluid, such as oil, water, gas or a combination thereof, can be detected.

It is a further object of the invention to present a method and a device that can detect whether the accumulation of sand or other solid material is in the form of an even layer on the vessel bottom or in the form of one or more discrete heaps.

It is a further object of the invention to present a method and a device by means of which it will be possible to estimate the total amount of accumulated sand or other solid material on the bottom of a vessel as described above.

BRIEF DESCRIPTION OF THE INVENTION

The primary object of the invention is achieved by means of a method as initially defined, characterised in that the temperature of the outside of the separator wall is measured and that the measured value is used for the determination of the existence of any accumulation of sand in the separator.

The invention takes advantage of the fact that, when there is a temperature difference between the fluid outside the vessel and the mixture of oil-water and sand that enters into the vessel, an accumulation of sand will lead to a different temperature of the vessel wall in the region of the sand deposit than in those regions of the vessel wall where the latter is in direct contact with other material than the sand, normally water, oil or oil-water emulsion.

According to a preferred embodiment the measurement of the temperature of the separator comprises a first measurement of the temperature in a first region of the separator where sand can be expected to accumulate and a reference measurement in a second region of the separator and a comparison of the temperature values of the first measurement and the reference measurement. Normally, the first region is a bottom region of the separator vessel. The second region should be a region in which sand is not likely to accumulate and be deposited, for example at or above a higher level of the vessel than the bottom region. If, for example, there is an obvious difference in temperature between a location at the bottom wall and a location at a side wall or top wall of the vessel, a sand deposit might be expected at said bottom location. The difference value can be used as an indication of the height or thickness of the sand deposit.

Preferably, the method comprises a plurality of first measurements at different locations in the first region. Thereby, it will be possible to detect whether the accumulation of sand or other solid material is in the form of an even layer on the vessel bottom or in the form of one or more discrete heaps.

The primary object of the invention is also achieved by means of the inventive device as initially defined, characterised in that it is provided with a means for measuring the temperature of an outside of the wall of the vessel.

Preferably, the measuring means is connected to a means for determining the existence of any accumulation of sand in the vessel based on the measured temperature value. The determination means may include any kind of device for treatment or evaluation of input from temperature sensors for the temperature measurement. It may comprise any suitable hardware and software for this purpose.

According to one embodiment of the invention the measurement means comprises a first means for measurement of the vessel wall temperature in a first region in which sand can be expected to accumulate and a second means for measurement of a reference temperature in a second region of the separator, preferably a region in which sand is not expected to accumulate during separator operation.

Said means for determining the existence of any accumulation of sand should be arranged to compare the temperature values of the first measurement and the reference measurement.

Preferably, the first means for measurement comprises a plurality of sensors for measurement of the wall temperature at a plurality of different locations in the first region.

Moreover, the means for measurement of the vessel wall temperature comprises at least one optic fibre temperature sensor.

It should be emphasized that the temperature measurement is performed on the outside of the separator vessel. If the vessel wall comprises a metal or metal alloy, such as steel, the temperature on the outer surface of the metal or metal alloy should be measured from the exterior of the wall. However, this feature does not exclude that there might be any kind of layer of other material, such as rubber, on top of the outer surface of the metal or alloy, and that the sensor or sensors might be arranged in between or sandwiched between such a layer and the main constructional part of the wall, i.e. the metal or metal alloy.

Further features and advantages of the present invention will be presented in the following detailed description of a preferred embodiment and in the remaining dependent patent claims.

BRIEF DESCRIPTION OF THE DRAWINGS

Hereinafter, a preferred embodiment will be described by way of example with reference to the accompanying drawings on which.

DETAILED DESCRIPTION OF THE INVENTION

Figure 1:
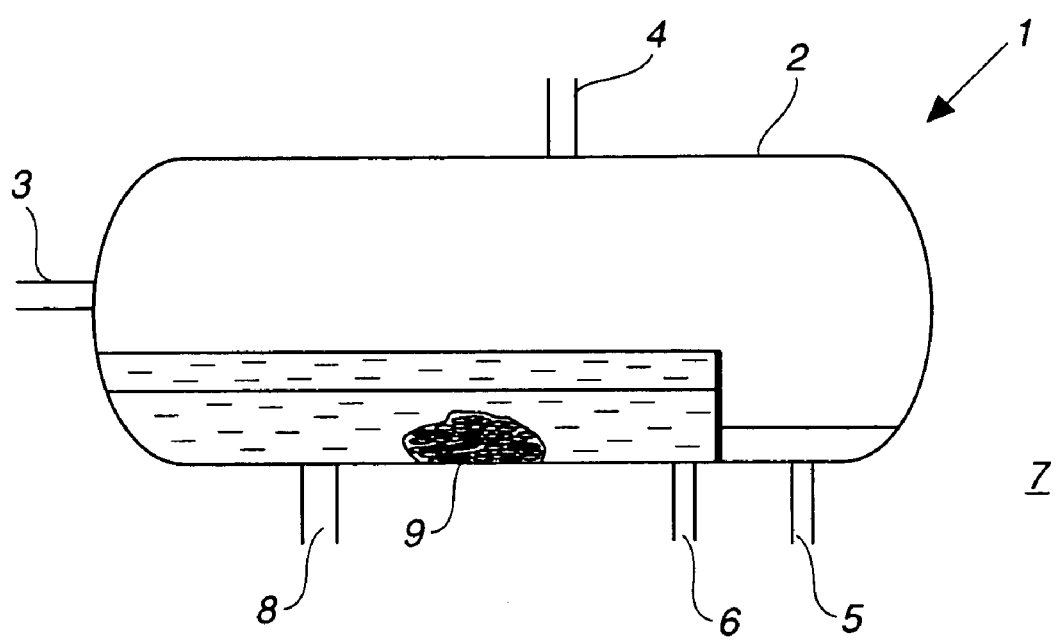
FIG. 1 is a schematic view showing a gravity separation vessel with a device according to the invention.

According to FIG. 1, a device according to the invention comprises a gravity separator 1 of the kind used in the oil and gas industry for the separation of water and gas from oil that has been won out of an oil well.

The separator 1 defines a vessel or tank 2 provided with an inlet 3 and separate outlets 4-6 for gas, oil and water respectively. The vessel 2 also comprises an outlet 8 for sand or other particulate, solid material that follows the oil and water from the well and accumulates at the bottom of the separator 1 due to the gravitational force. A flushing system (not shown) inside the separator vessel flushes out the sand through outlet 8 when required. In order to monitor the efficiency of this flushing system, and decided when to flush, it is imperative to monitor the solids build-up everywhere on the vessel bottom, as the solids may accumulate anywhere. A heap of sand 9 is indicated in FIG. 1. Typically, the vessel is a cylindrical vessel with a length of approximately 10 metres and width of approximately 3 metres. However the invention is not delimited to such vessel dimensions. The separator is surrounded by a fluid 7 such as sea water, in the case of a submerged subsea separator, said fluid having a temperature lower than the temperature of the liquid in the vessel 2.

Figure 2:
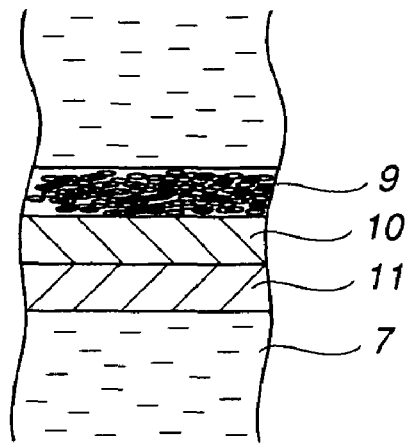
FIG. 2 is a cross section of a part of a section of vessel, including a heap of sand on the bottom thereof.

As can be seen in FIG. 2, the vessel consists of a steel wall 10 on the outside of which there is provided a layer 11 of a thermally insulating material, preferably rubber. Here, sand 9 covers the inside of the steel wall 10 at a bottom region thereof. In this example, the wall thickness is 100 mm, the rubber insulation thickness is 100 mm and the sand deposit thickness is 25 mm. The temperature of the fluid inside the vessel 2 is 100° C., and the temperature of the surrounding fluid, sea water, is 4° C.

The sand deposit will make the external steel wall temperature drop in the area of the deposit. The temperature drop is roughly proportional to the thickness of the sand deposit. To be more precise, the temperature drop is inversely proportional to the thermal conductivity of the sand deposit. This thermal conductivity is affected by the packing of the sand (i.e. whether it is loosely or densely packed). The thermal conductivity of the sand particles will also influence the thermal conductivity of the sand deposit layer, although it seems from literature investigations that thermal conductivity of sand does not vary much between different types of sand. Here, 25 mm of sand causes a temperature drop of approximately 1° C. at the outer surface of the steel wall, and such a temperature drop is easily detectable with fibre optic sensing.

By measuring temperature e.g. every square meter, one can in principle detect sand heaps of 1 meter or more in diameter. The grid spacing of the sensors thus affect the smallest detectable sand heap (which is roughly equal to the sensor grid spacing). As the sensors are spaced closer and closer together, a limit is reached where no further improvement is possible (as the heat flux does not only travel radially out from the separator, there is also some flow from warmer areas into colder areas). The densest usable spacing is related to the thickness of the steel wall, and is approximately two-three times this thickness (i.e. for a steel wall thickness of 100 mm, the densest usable sensor spacing is 200-300 mm, or 25-10 sensors per square meter). As long as only a few sensors are required (e.g. one per square meter), conventional temperature sensors can be used economically (e.g. Pt100 sensors). However, if a large vessel shall be populated with 25 temperature sensors per square meter, the cost becomes prohibitive.

It is known that an optical fibre can determine the temperature at every point of the fibre with good accuracy, using e.g. the known technique of Raman scattering. This can be done for fibres several kilometers in length. The cost of the optical fibre is minute, such that a dense sensor grid becomes economically feasible if such a system is used (which is what this invention proposes). Accordingly, the invention suggests the use of fibre optic sensors as a means for the measurement of the temperature of the steel wall, preferably the outer surface thereof. An optic fibre is normally capable of performing temperature measurements with a resolution, in the length direction of the fibre, of +/−1 meter, i.e. sand heaps more than 1 meter apart from each other can be individually detected. If, however, there is a need of detecting a hot or cold spot with a better precision than +/−1 meter, coils of fibre can be arranged at each measurement site. For example 3 to 5 metres of fibre can be wound into a coil the diameter of which is 25 cm, for the purpose of forming an arrangement which allows a more precise determination of the location of the cold spot. According to the invention, at a vessel of gravity separation type having the measures mentioned above, a preferred number of such coils per square metre is 4 in the bottom region of the vessel where accumulation of sand is likely to occur. Temperature measurement should also be performed at one or more reference spots, where gathering of sand is not likely to occur, for example along any of the side walls of the vessel, or the top of the vessel. The reference spot or spots should be located below the assumed level of the liquid in the vessel but above the likely height of the sand deposit or deposits. However, also the reference measurement is performed on the outside of the vessel in the same manner as the other temperature measurements.

Figure 3:
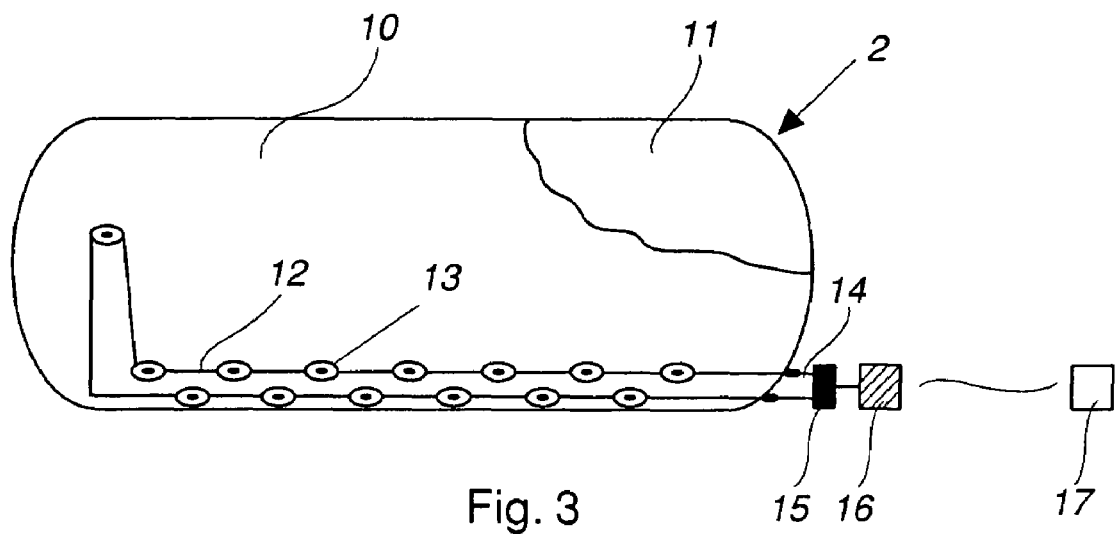
FIG. 3 is a schematic side view of a vessel provided with means for temperature measurement on the outside thereof.

For the housing of the fibre, the invention uses a tube 12, preferably a steel tube, or the like, and individual tube segments are wound into separate coils 13 that are positioned at those sites where temperature measurement is to be performed by means of the fibre, as schematically shown in FIG. 3. Further tube segments are used as connections between the individual tube coils. Thereby, the tube connections are welded to the coils. Eventually, one continuous tube 12 is provided, consisting of coils and intermediate connections. An optic fibre, or a plurality of optic fibres 14 for the purpose of obtaining redundancy, is introduced into the tube 12. For example, the fibre 14 might be pumped through the tube 12, using known techniques. Then the insulating rubber layer may be applied and vulcanised onto the steel wall and the tube 12.

The ends of the tube 12 are mounted to a connector plate 15 that, preferably, is attached to the vessel 2 by any means, for example welding. Preferably, such a connector plate 15 is positioned such that it can be connected by a remotely operated vehicle (ROV) to a nearby sensor interrogation unit 16 (scanner device). The connector plate 15 is connected to the scanner device 16 for scanning the signals from the fibre sensors 14. The connections to the scanner are preferably made via jumper cables, which can be connected and disconnected using a remotely operated vehicle (ROV). This will allow the scanner 16 to be retrieved for service. The scanner 16 has an input for interrogating the sensors 14 and another input for power supply, for example from a nearby subsea control system 17, and for communicating the result of the measurement to a nearby subsea control system unit 17. The scanner delivers a table showing temperature for each length unit of the fibre, for example each metre. A control pod might be arranged for the purpose of delivering this information, for example by means of any signalling method, to any control unit (not shown), such as a PC, used by an operator. The control unit might be arranged to interpret the signals and to produce a contour map or the like, showing the existence and amount of any sand deposits, of the bottom region of the vessel. Such a map or the like can be shown to the operator by means of a display connected to the control unit.

It should be realised that the above presentation of the invention has been made by way of example, and that alternative embodiments will be obvious for a person skilled in the art without going beyond the scope of protection as claimed in the annexed patent claims supported by the description and the annexed drawings.

The invention claimed is:

1. A method of detecting an accumulation of sand in a separator vessel, the separator being filled with a fluid that has a first temperature and being at least partly surrounded by a fluid that has a second temperature, wherein a temperature of an outside of a wall of the separator is measured and wherein the measured temperature of the outside of the wall of the separator is used in determining an existence of any accumulation of sand in the separator.

2. The method according to claim 1, wherein measuring the temperature of the outside of the wall of the separator comprises a first measurement of a temperature in a first region of the separator where sand can be expected to accumulate and a temperature reference measurement in a second region of the separator and a comparison of the temperature in the first region and the temperature reference measurement.

3. The method according to claim 2, wherein the first region is a bottom region of the separator vessel.

4. The method according to claim 2, wherein the method comprises a plurality of first measurements at different locations in the first region.

5. The method according to claim 1, wherein measuring the temperature of the outside of the wall of the separator is performed by means of at least one fiber optic sensor attached to the outside of the wall of the separator.

6. A separator device, comprising:
a vessel for separating water from oil;
means for measuring a temperature of an outside of a wall of the vessel; and
means for determining an existence of any accumulation of sand in the vessel based on the measured temperature of the outside of the wall of the vessel.

7. The separator device according to claim 6, wherein said means for measuring is connected to said determining means.

8. The separator device according to claim 6, wherein the means for measuring comprises a first means for measurement of a temperature of the outside of the wall of the vessel in a first region in which sand can be expected to accumulate and a second means for measurement of a reference temperature in a second region of the separator.

9. The separator device according to claim 8, wherein said means for determining the existence of any accumulation of sand is arranged to compare the the measured temperature in the first region and the measurement of the reference temperature.

10. The separator device according to claim 9, wherein the first region is a bottom region of the vessel.

11. The separator device according to claim 8, wherein the first means for measurement comprises a plurality of sensors for measurement of the temperature of the outside of the wall at a plurality of different locations in the first region.

12. The separator device according to claim 6, wherein the means for measuring the temperature of the outside wall of the wall of the vessel comprises at least one optic fiber temperature sensor.

13. The separator device according to claim 6, wherein means for determining the existence of any accumulation of sand in the vessel based on the measured temperature of the outside of the wall of the vessel is connected to a display for visually displaying an outcome of a sand detection to an operator.

* * * * *